United States Patent
Manis et al.

(10) Patent No.: US 6,844,809 B2
(45) Date of Patent: Jan. 18, 2005

(54) PASSIVE OPTICAL NETWORK BACKHAUL FOR POWERLINE COMMUNICATIONS

(76) Inventors: Constantine N. Manis, 11 Drinking Brook Rd., Monmouth Junction, NJ (US) 08852; Oleg Logvinov, 27 Beacon Hill Rd., East Brunswick, NJ (US) 08816; Lawrence F. Durfee, 85 Lenape Trail, Washington, NJ (US) 07882-2145

( * ) Notice: Subject to any disclaimer, the term of this patent is extended or adjusted under 35 U.S.C. 154(b) by 112 days.

(21) Appl. No.: 10/309,567

(22) Filed: Dec. 4, 2002

(65) Prior Publication Data

US 2004/0004538 A1 Jan. 8, 2004

Related U.S. Application Data

(60) Provisional application No. 60/338,736, filed on Dec. 4, 2001.

(51) Int. Cl.[7] ............................................. H04M 11/04
(52) U.S. Cl. ............................ 340/310.02; 340/310.01; 340/310.06; 340/310.08
(58) Field of Search ........................ 340/310.01, 310.02, 340/310.03, 310.06, 310.07, 310.08, 870.03, 870.11; 700/83; 725/116, 131; 359/125, 128; 375/296

(56) References Cited

U.S. PATENT DOCUMENTS

| | | | |
|---|---|---|---|
| 3,900,842 A | * 8/1975 | Calabro et al. | 340/310.03 |
| 4,204,195 A | * 5/1980 | Bogacki | 340/870.03 |
| 4,709,339 A | 11/1987 | Fernandes | 340/310.01 |
| 4,714,912 A | 12/1987 | Roberts et al. | 340/310.02 |
| 5,630,204 A | 5/1997 | Hylton et al. | 340/310.06 |
| 5,815,295 A | * 9/1998 | Darcie et al. | 398/72 |
| 6,278,357 B1 | 8/2001 | Croushore et al. | 340/310.01 |
| 6,404,348 B1 | * 6/2002 | Wilfong | 340/657 |
| 6,587,739 B1 | * 7/2003 | Abrams et al. | 700/83 |
| 6,744,824 B1 | * 6/2004 | Duvaut et al. | 375/296 |

* cited by examiner

Primary Examiner—Van T. Trieu
(74) Attorney, Agent, or Firm—Norris, McLaughlin & Marcus

(57) ABSTRACT

System, apparatus and method for connecting a passive optical network ("PON") to a power line communications ("PLC") network using a PLC HeadEnd installed at the PON to provide for distribution of high speed, broadband data communications services available on the PON to the PLC network using high speed, broadband PLC data signals. Where the PLC HeadEnd is installed on a medium voltage power distribution network, a PLC bypass unit is installed at a medium voltage/low voltage power transformer in the PLC network to provide PLC signal connectivity between the MV and LV networks. A PLC residential gateway is installed at each end user facility, such as a home or business, desiring broadband service available on the PON.

15 Claims, 3 Drawing Sheets

PASSIVE OPTICAL NETWORK BACKHAUL FOR POWERLINE COMMUNICATIONS

CROSS REFERENCE TO RELATED APPLICATION

This application claims the benefit of U.S. Provisional Appln. No. 60/338,736 filed Dec. 4, 2001, which is incorporated by reference herein.

FIELD OF THE INVENTION

This invention relates to the field of data communications over conventional utility electric power conveying media, and more particularly to connecting passive optical networks ("PONs") to existing, electric power distribution networks using power line communications ("PLC") apparatus to make high speed, broadband data communications services on the PONs readily accessible on a PLC network.

BACKGROUND OF THE INVENTION

High speed, broadband data communications service, such as the Internet, telephony, broadcast TV and video-on-demand, is typically delivered to homes and businesses over optical fiber cable, coaxial cable and copper wire, or various combinations thereof. Optical fiber is a most preferred media for delivery of broadband data communications services, because it has a much greater bandwidth capability than coaxial cable and copper wire. As a result, miles of optical fiber cable have been installed in an attempt to establish a high speed data communications network that interconnects broadband service providers with an end user facility, such as a residential home or apartment building or an office building. The proliferation of optical fiber cable installations, however, has not extended to a large number of end user facilities because of the high cost associated with installing optical fiber cable and associated optical signal equipment between an access point of an optical fiber cable data communications network and an end user facility, such as to the curb of or immediately outside or adjacent to a home or office building.

It is currently known to use a passive optical network ("PON") implementation for providing high speed, broadband data communications service at geographically distant locations. See, for example, Evans, Shara, *STANDARDS WATCH: Passive Optical Networks*, CommsWord (May 2001) and *Asynchronous Transfer Mode (ATM) Passive Optical Networks (PONs)*, The International Engineering Consortium (Jul. 27, 2001), incorporated by reference herein. The overall cost of the optical fiber cables and the optical system equipment included in a PON is low relative to its high bandwidth and low loss signal transmission capabilities. A complete PON implementation requires that content is delivered directly to an end user, such as to within a home or business. As optical fiber installations usually do not exist at an end user facility, current PON implementations utilize some form of copper cable, coupled with a high speed data delivery technology, such as VDSL, etc., to bridge the distance between a termination of the PON located outside of the end user facility and broadband data service consumption devices, such as computers, HDTV decoders, etc., within the facility. Consequently, in most PON implementations, a communications cable, such as coaxial or copper cable, and a PON interface device, which is mounted to a utility pole and couples the PON to the communications cable, must be installed to provide the data communications bridge between the home or business and the PON. The cost of installing this final segment of a broadband data communications service network is relatively high, which has hindered the widespread deployment of high speed, broadband services using a PON.

Therefore, there exists a need for extending the high speed, broadband data communications services available on a PON to an end user facility with relative ease and at low cost.

SUMMARY

In accordance with the present invention, a passive optical network/power line communications ("PON/PLC") method and system provides for relatively quick, easy and inexpensive coupling of a passive optical network ("PON") to existing, conventional electrical power conveying media to provide for distribution to an end user facility, such as a home or business, of high speed, broadband data communications services that are made available on the PON by high speed, broadband data communications service providers. The electrical power media can include low voltage, medium voltage and high voltage electrical power lines of existing, electrical power distribution networks.

In a preferred embodiment of the present invention, a PON/PLC system includes a PON/PLC HeadEnd coupled to an optical network termination of a PON and to a medium or low voltage power line of an electrical power distribution network. In addition, the PON/PLC system includes a PLC residential gateway (RG) which is coupled to the low voltage electrical power lines of the power distribution network existing within an end user facility, preferably by plugging the RG into a conveniently located electrical wall outlet in the facility. The PLC HeadEnd includes high speed PLC data processing components which provide that the high speed, broadband data communication streams carried by optical signals on the PON are then carried on digitally encoded PLC signals, over the power lines of the power distribution network, directly to the end user facility. At the end user facility, the RG receives and processes the PLC signals to provide that the end user can access the broadband services made available on the PON.

BRIEF DESCRIPTION OF THE DRAWINGS

Other objects and advantages of the present invention will be apparent from the following detailed description of the presently preferred embodiments, which description should be considered in conjunction with the accompanying drawings in which.

DETAILED DESCRIPTION OF THE INVENTION

The present invention utilizes high speed PLC technology to provide for the delivery of high bandwidth, multi-media information, such as telephony, video-on-demand, broadcast TV, etc., available on a PON directly to an end user facility, such as a home or business, over conventional electrical power conveying media of an existing electrical power distribution network with relative ease and at a moderate installation cost.

Figure 1:
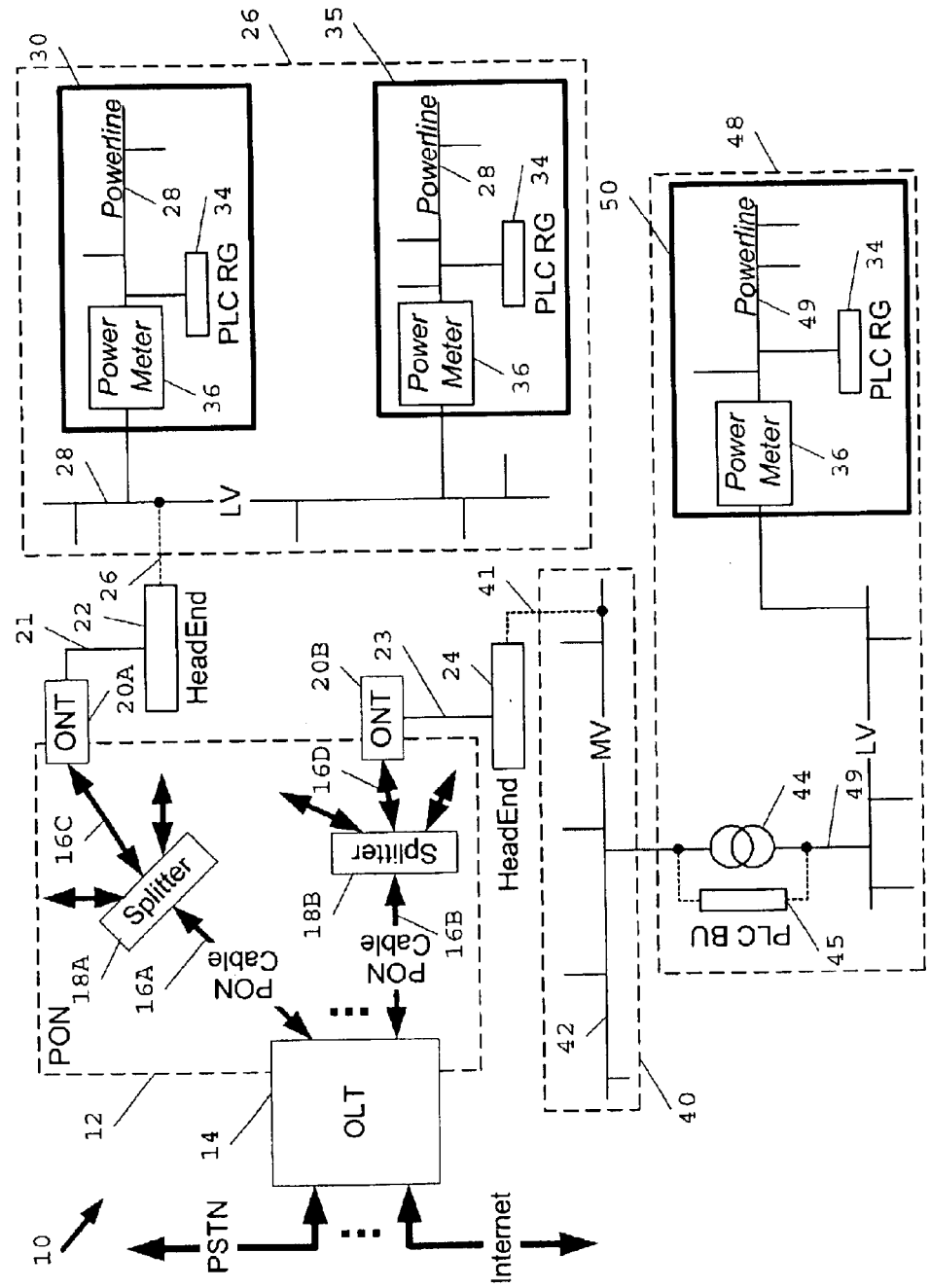
FIG. 1 is a block diagram of a preferred embodiment of a PON/PLC broadband data communications service network, in accordance with the present invention, including PON/PLC HeadEnds coupled to a PON and to a conventional electrical power distribution network and PLC residential gateways at respective end user facilities also coupled to the power distribution network.

FIG. 1 is a PON/PLC broadband data communications service network 10 in accordance with a preferred embodiment of the present invention. Referring to FIG. 1, the network 10 includes a passive optical network ("PON") 12 containing an optical line termination ("OLT") 14. The OLT 14 is coupled to broadband data communications service providers, such as a video server providing video-on-demand, a publicly switched telephone network ("PSTN"), an Internet service provider and a broadcast video and audio service provider, e g., CATV provider, etc., which are external to the PON 12. The broadband service providers interface with the PON 12 using conventional interconnections, as suitable.

Optical fiber cables 16A and 16B of the PON 12 couple the OLT 14 to passive optical splitters 18A and 18B, respectively. Each of the splitters 18 includes optical signal output ports for coupling to optical fiber cables. Optical fiber cables 16C and 16D couple output ports of the splitters 18A and 18B to optical network terminations ("ONT") 20A and 20B, respectively.

Referring again to FIG. 1, conventional electrical data signal transmission media 21 and 23, such as a coaxial cable or a serial copper wire Ethernet connection, couple PON/PLC HeadEnds 22 and 24 to the ONTs 20A and 20B, respectively. In the illustrated preferred embodiment, conventional, low voltage electrical power conveying media 26 couples the HeadEnd 22 to low voltage electric power lines 28 of a low voltage ("LV") electrical power distribution PLC access network 26. The lines 28 of the LV network 26 extend into end user facilities, such as homes 30 and 32. Each of the homes 30 and 32 includes a PLC residential gateway ("RG") 34 coupled to the power line wiring 28 within the home, where the RG 34 is, preferably, on the user side of a power meter 36 that is connected to the lines 28 coming into the home.

Referring again to FIG. 1, conventional, medium voltage ("MV") electrical power conveying media 41 couples the HeadEnd 24 to MV electric power lines 42 of a MV electrical power distribution PLC access network 40. A MV-to-LV transformer 44 couples the network 40 to a LV electrical power distribution network 48 including LV power lines 49. The lines 49 extend into an end user home 50. The home 50, like the homes 30 and 32, includes a PLC residential gateway 34 coupled to the LV power lines 49. The RG 34 in the home 50, preferably, is positioned on the user side of a power meter 36 also coupled to the power lines 49 within the home 50. Further, a PLC bypass unit 45 couples the MV lines 42 of the MV network 40 to the LV lines 49 of the LV network 48.

The PON 12 is a well known optical signal network configuration that typically includes an OLT, optical fibers cables, passive optical splitters and an ONT as described above in connection with FIG. 1. The OLT 14 is a well known device including passive optical components, and optionally including active optical signal processing components and electrical signal processing components, which couples high speed broadband data streams provided by broadband data communications service providers, such as a PSTN, Internet service provider, cable television service provider, to optical fiber cables of a PON. The optical fiber cables 16 are well known in the art, and provide relatively low signal loss over long signal transmission distances, such as distances in excess of 10 miles, and very high, full duplex bandwidth, such as 10 Gb/s. The passive optical splitters 18 are well known devices in the art that permit point to multi-point full duplex optical communications between ports, which are for coupling to optical fiber cables. The ONTs are well known devices used to interconnect optical fiber cables to electrical signal conveying cables, such as Ethernet copper cables.

Figure 2:
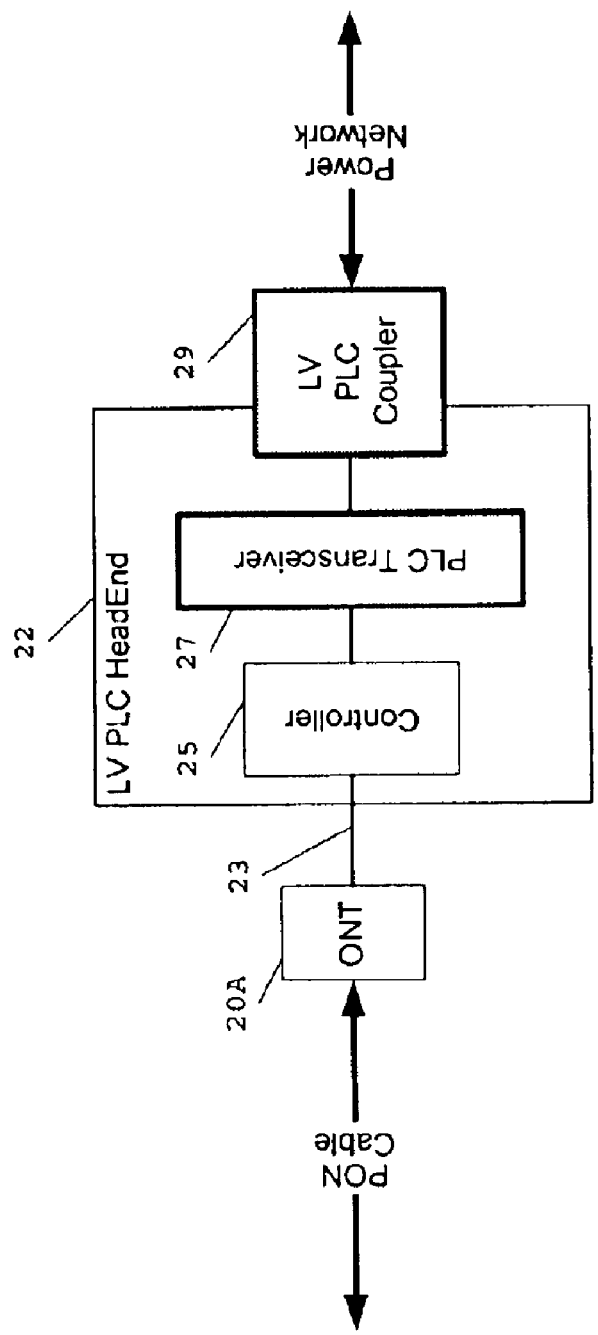
FIG. 2 is a block diagram of a preferred embodiment of a PLC HeadEnd as connected in the PON/PLC network shown in FIG. 1.

Each of the HeadEnds 22 and 24 operates to couple PLC signals to and from the power lines to which it is connected and also to protect electronically sensitive PLC processing components therein. A preferred embodiment of the HeadEnd 22, as connected in the network 10, is shown in FIG. 2 for purposes of illustration. Referring to FIG. 2, the HeadEnd 22 includes a high speed PLC controller 25, with a processor and memory (not shown), that interfaces with the ONT 20A via the cable 23. The PLC controller 25 is preferably capable of processing signals having data rates associated with data communications services transmitted from a PON directly onto a LV network. A PLC transceiver 27 couples the PLC controller 25 to a conventional LV PLC coupler 29, which is for coupling to LV power lines. Preferred embodiments of the PLC controller 25 and the PLC transceiver 27 are described, for example, in U.S. patent application Ser. No. 10/211,033, filed Aug. 2, 2002, assigned to the assignee of this application and incorporated by reference herein.

In a preferred embodiment, the PLC controller 25 and the PLC transceiver 27 include high speed data processing capabilities having sufficient bandwidth to maintain the same or substantially the same bandwidth on encoded digital PLC data signals generated at the transceiver 27 as the data bandwidth existing on the optical signals received at the ONT 20A and whose destination is a device, such as a computer or HDTV decoder, at a downstream end user facility. Further, the HeadEnd 22 is preferably readily programmable and modular to provide for flexibility with various, different network topologies and service needs. Data encryption, for example, is performed because both optical signal conveying media and PLC media are shared in the network 10.

The HeadEnd 24 is substantially identical in construction and operation as the HeadEnd 22, except that the HeadEnd 24 includes a PLC coupler for coupling to a MV power network, rather than an LV network, and the PLC controller and PLC transceiver combination can process signals having data rates associated with broadband service transmission from a PON onto a MV network, which usually are much higher than those expected to be transmitted onto an LV network from a PON.

The RG is a conventional PLC gateway, and preferably is a PLC gateway having the features described in U.S. patent application Ser. No. 10/211,033. The RG is installed at an end user facility, preferably by plugging into the LV power lines in the facility, to permit an end user in the facility to receive and process the PLC signals available on the LV power lines of the LV network.

The bypass unit 45 is a well known, conventional prior art PLC apparatus that provides PLC data communications signal connectivity between electronic devices in a MV power distribution network and electronic devices in a LV power distribution network. For example, the bypass unit 45 can constitute a PLC repeater as described in U.S. patent application Ser. No. 10/211,033.

Referring to FIGS. 1 and 2, in operation of a preferred embodiment of the network 10, high speed, broadband data communications service providers generate and make available high speed, broadband downstream data streams modulated on optical carrier signals. The OLT 14 receives these broadband optical signals, optionally processes them as may be required, and then couples the broadband optical signals directly to the optical fiber cables 16 of the PON 12. In an alternative embodiment where the broadband data is provided to the PON 12 modulated on electrical signals, the electrical signals are suitably converted to broadband optical signals at the OLT 14, as is conventional in the art. The downstream broadband optical signals are conveyed over the cables 16A and 16B of the PON 12 to the passive splitters 18A and 18B, and then distributed over the cables 16C and 16D to the ONTs 20A and 20B, respectively.

The ONTs 20A and 20B convert the broadband, optical signals into electrical signals that are modulated with the downstream broadband high speed data used to modulate the optical signals. These data modulated electrical signals are then conveyed over the cables 21 and 23 to the HeadEnds 22 and 24, respectively. At each of the HeadEnds 22 and 24, the PLC controller 25 performs suitable data and signal processing operations on the received electrical signals and generates digitally encoded data that the PLC transceiver 27 uses to generate digitally encoded downstream broadband PLC signals, including suitable protocol encoding such as, for example, data encryption. In accordance with the present invention, the PLC transceiver 27 at each of the HeadEnds generates downstream broadband PLC signals having the same or substantially the same data bandwidth as corresponding downstream broadband optical signals received at the respective ONTs.

For the HeadEnd 22, the PLC transceiver 27 transmits the downstream broadband PLC signals, via the coupler 29 and the LV line 26, onto the LV lines 28 of the network 26. The RG 34 in each of the homes 30 and 32 receives and processes the downstream broadband PLC signals to provide for access to broadband services, such as by a computer or video-on-demand decoder. In a preferred embodiment, the combination of high speed PON technology with high speed PLC technology at the HeadEnd provides that multiple, high bandwidth services can be delivered directly to an end user facility.

In upstream operation of the network 10, the RG 34 transmits upstream digitally encoded PLC data over the lines 28 for receipt at the HeadEnd 22. The HeadEnd 22 converts the PLC signals, which include protocol encoding, into data modulated optical signals, which are then conveyed over the optical fiber cables of the PON 12 to a desired destination, such as a PSTN.

The HeadEnd 24 operates substantially identically to the HeadEnd 22, except that the HeadEnd 24 transmits higher data rate, broadband downstream PLC data signals, via the line 41, onto the lines 42 of the MV network 40. As the MV/LV transformer 44 substantially blocks the transmission of PLC signals, the bypass unit 45 operates to couple the PLC signals transmitted on the lines 42 of the MV network 40 to the lines 49 of the LV network 48. The downstream PLC signals on the network 48 are distributed to the RG 34 of the home 50 in a similar manner as described above for the LV network 26. Upstream signal transmission is performed in a manner similar to that described above for the network 26, except that the PLC signals are transmitted through the intermediate MV network 40 and MV lines before reaching the HeadEnd 24.

Figure 3:
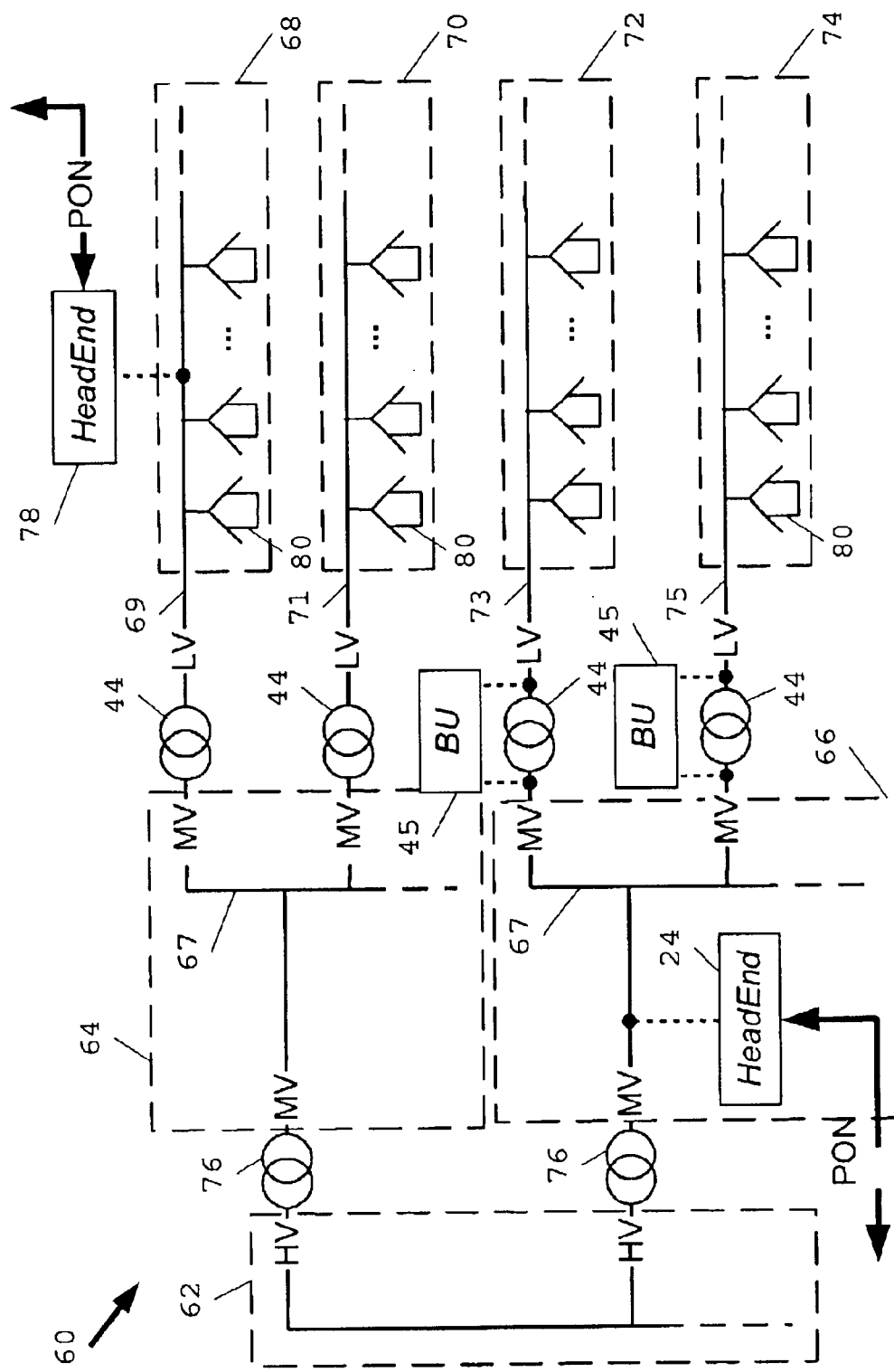
FIG. 3 is a block diagram of another preferred embodiment of a PON/PLC broadband data communications service network, in accordance with the present invention, including PON/PLC HeadEnds coupled to medium voltage and low voltage power conveying media of an electrical power distribution network.

FIG. 3 illustrates another preferred embodiment of a PON/PLC data communications service network 60 in accordance with the present invention. Like reference numerals are used to identify elements identical, or substantially identical, in construction and operation as those elements described above. Referring to FIG. 3, the network 60 includes a high voltage ("HV") electrical power distribution network 62, MV electrical power distribution networks 64 and 66 and LV electrical power distribution networks 68, 70, 72 and 74. Conventional, high voltage/medium voltage transformers 76 couple the HV network 62 to the MV networks 64 and 66, respectively. A medium voltage/low voltage transformer 44 couples the MV network 64 to each of the LV networks 68 and 70 and the MV network 66 to each of the LV networks 72 and 74.

In accordance with present invention, a PON/PLC HeadEnd 24 is coupled to MV power lines 67 of the MV network 64 and a PON/PLC HeadEnd 78 is coupled to LV power lines 69 of the LV network 68. In addition, bypass units 45 couple the MV power lines 67 of the network 66 to LV power lines 73 and 75 of the LV networks 72 and 74, respectively. The HeadEnd 78 is preferably identical, or substantially identical, to the HeadEnds 22 in construction and operation and is for coupling to an ONT of a PON. Each of the networks 68, 70, 72 and 74 includes end user facilities 80 which are coupled to the respective LV power lines of the LV networks. The facilities 80 can include residential gateways (not shown) for coupling to the LV power lines and providing PLC data communications capabilities.

In a further preferred embodiment, a PLC HeadEnd is installed at a specific location of a PON based on the PON network topology, the broadband service subscription pattern at end user facilities, availability of a PON connection, availability of a suitable building to house HeadEnd equipment, availability of suitable content on the segment of the PON at interest, access to MV or LV power lines for establishing PLC connections, and the maximum distance between the ONT and an end user facility, such that PLC repeaters would be required. In addition, the LV network topology is determined, for example, by the number of end user facilities, such as homes or businesses, connected to a single MV/LV transformer, which varies throughout North American and is different in Europe and Asia.

Referring again to FIG. 3, in a preferred embodiment of the network 60, an RG is installed on a LV network, such as the network 68, to provide that that LV network 68 and an in-home communications network in an end user facility 80 share the same network. In this embodiment, the elements of the LV network and the in-home network are isolated from one another through the use of encryption and addressing. For example, communication end-points within a home, such an HDTV decoder or computer, are assigned unique in-home addresses, and elements on the LV network are assigned addresses from another pool of unique access addresses. Encryption insures that the data on any common medium is useable only at the appropriate consumers at an end user facility.

In another preferred embodiment where the LV access network is independent from the in-home network of an end user facility, the RG is installed to act as a gateway from a LV access network into an in-home network of an end user facility.

Thus, the present invention provides for distribution of high speed, broadband data to an end user from an ONT of a PON using existing, electrical power conveying media of an electrical power distribution network that extends from an end user facility to or near the ONT. The cost of accessing, and distributing onto a PLC network, the broadband data services available on the PON is relatively low because the electrical power conveying media, such as MV or LV power lines over which the broadband PLC data signals are to be conveyed, are already existing and the cost of the PON/PLC HeadEnd equipment is low. The need to install only the PLC/PON HeadEnd to effectively extend the broadband services on the PON into an end user facility eliminates the costly need to install cables or other types of equipment. As the PLC network likely exists in all locations where communications is desirable, the present invention makes available ample communications bandwidth for all desired services provided on a PON.

Although preferred embodiments of the present invention have been described and illustrated, it will be apparent to those skilled in the art that various modifications may be made without departing from the principles of the invention.

What is claimed is:

1. A power line communications ("PLC") apparatus comprising:
    a PLC coupler for coupling to conventional, utility electrical power conveying media; and
    a PLC controller/transceiver for receiving and processing data modulated electrical signals available at an optical network termination ("ONT) and having a first bandwidth, wherein the PLC controller/transceiver generates digitally encoded data modulated PLC signals having a second bandwidth for transmission over the conventional electrical power conveying media, wherein the first and second bandwidths are substantially identical.

2. The apparatus of claim 1, wherein the first bandwidth is broadband.

3. The apparatus of claim 1, wherein the data modulated electrical signals at the ONT are based on data modulated optical signals including multi-media and interactive data streams.

4. The apparatus of claim 1, wherein the PLC coupler is for coupling to a medium voltage power line network.

5. The apparatus of claim 1, wherein the PLC coupler is for coupling to a low voltage power line network.

6. A passive optical network/power line communications ("PON/PLC") system comprising:
    a PON/PLC HeadEnd for coupling to conventional, electrical power conveying media and an optical network termination ("ONT") of a passive optical network ("PON") on which high speed, broadband data communications services are distributed on optical signal carriers, wherein the broadband services correspond to a predetermined data bandwidth, wherein the HeadEnd generates digitally encoded data modulated PLC signals having a bandwidth substantially equal to the predetermined bandwidth for transmission over the conventional electrical power conveying media; and
    a PLC residential gateway ("RG") for coupling to low voltage ("LV") power lines of a LV power line network existing within an end user facility and processing received PLC signals to provide for access to the broadband services distributed on the optical signal carriers conveyed on the PON.

7. The system of claim 6, wherein the HeadEnd is for coupling to a medium voltage ("MV") electrical power distribution network, the system further comprising a bypass unit for providing PLC signal connectivity between the MV network and the LV network.

8. The system of claim 6, wherein the predetermined data bandwidth is broadband.

9. The system of claim 8, wherein the broadband data includes multi-media and interactive data streams.

10. The system of claim 6, wherein the PLC HeadEnd includes a low voltage power line coupler.

11. A method for passive optical network/power line communications ("PON/PLC") comprising:
    coupling a PON/PLC HeadEnd to a conventional, electrical power conveying media and an optical network termination ("ONT") of a passive optical network ("PON");
    receiving at the HeadEnd high speed, broadband data communications services on optical signal carriers of the PON, wherein the broadband services correspond to a predetermined data bandwidth;
    generating at the HeadEnd digitally encoded data modulated PLC signals having a bandwidth substantially equal to the predetermined bandwidth;
    transmitting the PLC signals over the conventional electrical power conveying media; and
    receiving the PLC signals at a PLC residential gateway ("RG") coupled to low voltage ("LV") power lines of a LV power line network existing within an end user facility, wherein the RG processes the received PLC signals to provide for access to the broadband services distributed on the optical signal carriers conveyed on the PON.

12. The method of claim 11, wherein the HeadEnd is for coupling to a medium voltage ("MV") electrical power distribution network, the method further comprising providing a bypass unit for providing PLC signal connectivity between the MV network and the LV network.

13. The method of claim 11, wherein the predetermined data bandwidth is broadband.

14. The method of claim 13, wherein the broadband data includes multi-media and interactive data streams.

15. The method of claim 11, wherein the PLC HeadEnd includes a low voltage power line coupler.

* * * * *